F. M. ROSS.
RIM BREAKER.
APPLICATION FILED MAY 8, 1920.
1,402,660.
Patented Jan. 3, 1922.
2 SHEETS—SHEET 1.
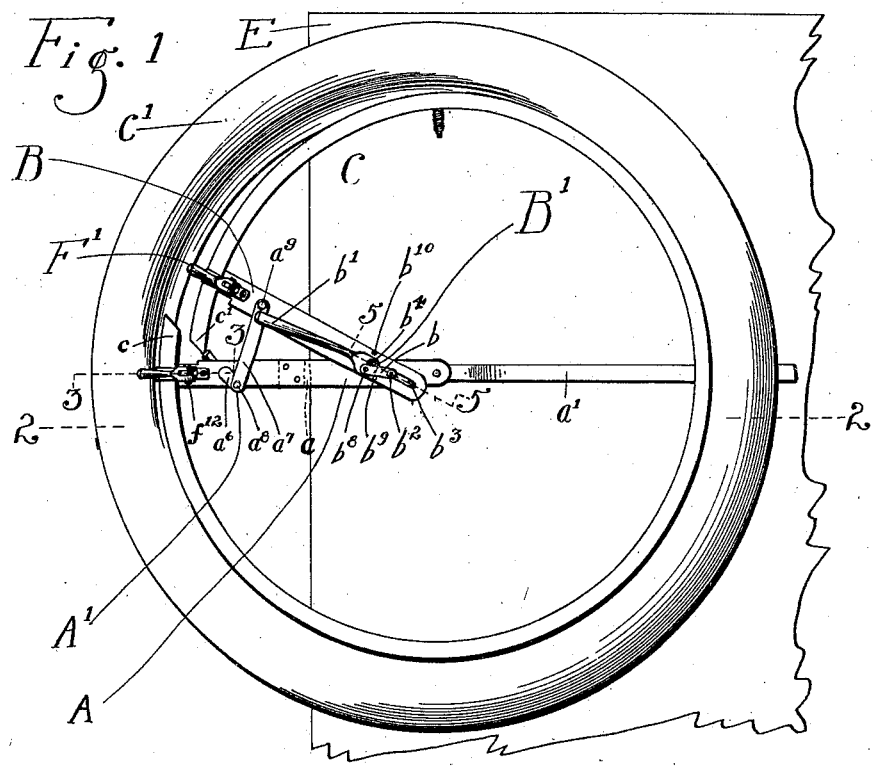
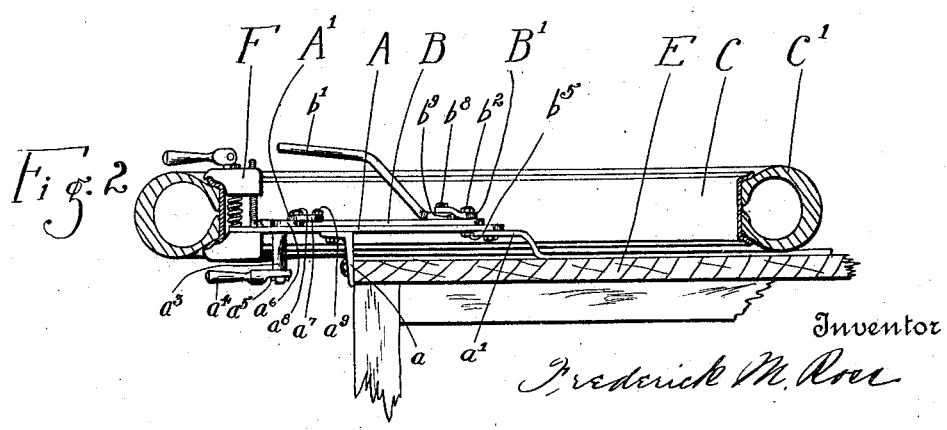
Inventor
Frederick M. Ross
By Walter F. Murray
Attorney

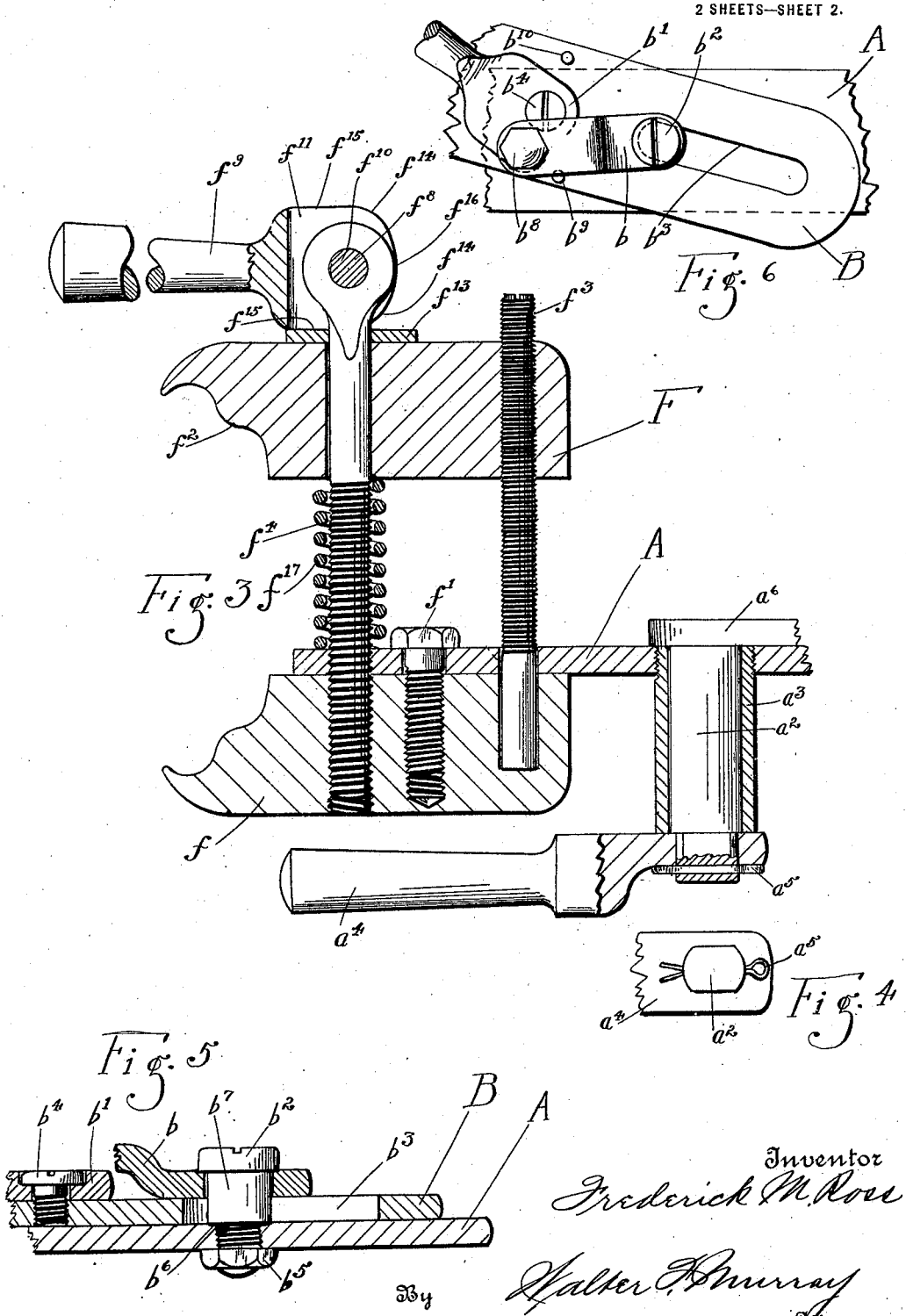

UNITED STATES PATENT OFFICE.

FREDERICK M. ROSS, OF CINCINNATI, OHIO.

RIM BREAKER.

1,402,660. Specification of Letters Patent. Patented Jan. 3, 1922.

Application filed May 8, 1920. Serial No. 380,950.

*To all whom it may concern:*

Be it known that I, FREDERICK M. ROSS, a citizen of the United States of America, and a resident of Cincinnati, in the county of Hamilton and State of Ohio, have invented a new and useful Improvement in Rim Breakers, of which the following is a specification.

An object of my invention is to provide a rim contractor that will operate upon any split rim regardless of size or type.

Another object of my invention is to provide a device for the purpose stated, for use especially in garages and repair shops, where a machine must withstand hard usage, and must be adapted to be quickly adjusted and operated.

Another object of my invention is to produce a machine wherein the power exerted by the operator will be multiplied manifold by the device, in its operation upon the rim.

These and other objects are attained by means described herein and disclosed in the accompanying drawing in which:

Fig. 1 is a plan view of a rim contractor embodying my invention, mounted upon a work bench, and operating upon a rim.

Fig. 2 is a sectional view on line 2—2 of Fig. 1.

Fig. 3 is an enlarged sectional view on line 3—3 of Fig. 1.

Fig. 4 is a bottom plan view showing the means and method employed for attaching a handle to the lever, all of which form details of my invention.

Fig. 5 is an enlarged sectional view on line 5—5 of Fig. 1.

Fig. 6 is a plan view, on enlarged scale, of the radial reciprocating means forming a detail of my invention.

A is a base plate fixed to and above the bench or platform by angle brackets $a$ and $a'$. B is a plate or lever which is movable longitudinally of itself and is pivoted for circumferential movement on A. A' designates a bell crank lever comprising an arm $a^6$ integral with the post $a^2$ pivoted in a sleeve $a^3$ projecting below the plate A. The post $a^2$ is provided with a handle $a^4$ fastened to the post by a cotter pin $a^5$. The bell crank lever A' through link $a^7$ connected at $a^8$ to the arm $a^6$ and at $a^9$ to the movable plate or lever B is used to swing the lever B circumferentially toward and away from the fixed plate A. The link $b$ pivoted at one end on the shoulder bolt $b^2$ passing through the slot $b^3$ in the movable plate B has its other end pivoted to the handle lever $b'$ pivoted on the machine screw $b^4$ inserted in the movable plate B. The method of mounting the plate B for movement on the plate A and of the handle lever $b'$ is shown in Fig. 5 where the bolt $b^7$ having a shoulder $b^6$ resting on the plate A is fastened by a nut $b^5$.

The clamping devices F and F' fixed respectively to the plates A and B are constructed similarly to one another. The lower jaw $f$ of the device F is bolted to the outer end of plate A by means of the screw $f'$. The upper jaw $f^2$ is supported in vertical alignment with the jaw $f$, by means of the adjusting screw $f^3$ and the adjustable screw bolt $f^4$. The upper end of the adjusting screw $f^3$ is threaded, and engages in a threaded way formed in the rear of the upper jaw $f^2$, and extends beyond the upper surface of said jaw. The lower end of the screw $f^3$ is loosely seated in a socket in the base plate A and lower jaw $f$. The bolt $f^4$ has its lower end in threaded engagement with the base plate A and lower jaw $f$ and above its threaded portion is a smooth portion which passes loosely through a hole in the upper jaw. The upper end of the screw bolt, extends above the upper surface of the jaw $f^2$ and has an eye $f^8$ formed in it. The handle $f^9$ is attached to the bolt $f^4$ by means of the pin $f^{10}$ extending through the lugs $f^{11}$ and $f^{12}$ formed on the lower end of the handle $f^9$ and through the eye in the bolt, the end of which bolt extends between the lugs. A washer $f^{13}$ is mounted about the bolt $f^4$ between the upper surface of the jaw $f^2$ and the handle $f^9$. The pin is spaced closer, relatively to the lower edges $f^{16}$, than to the side edges $f^{15}$, of the lugs, the corners $f^{14}$ of which are rounded, so that when the handle $f^9$ is moved to a horizontal position the bolt will be drawn upward through the jaw $f^2$.

The operation of my device is as follows:

The rim C with the tire C' mounted thereon is supported at its rear end upon the angle bracket $a'$, while the ends $c$ and $c'$ of the rim are secured between the jaws of F and F' respectively. The split in the rim is spaced between the clamping devices F and F'. The handle $a^4$ is moved to such position as is shown in Fig. 1, when the clamp F' is to be secured to the rim. The jaws are secured upon the rim by first adjusting the jaws so that they will be spaced apart at a distance slightly greater than the width of the rim, the handle $f^9$ being in a vertical position. The rim is inserted between the jaws $f$ and $f^2$ and the handle $f^9$ moved to a horizontal position, whereby the jaws will clamp the rim between them. The screw $f^3$ serves to bind the rear ends of the jaws and prevents them being moved together when the handle $f^9$ is moved to a horizontal position. The adjustment of the jaws is accomplished by jointly screwing the bolt $f^4$ and screw $f^3$ through the jaws $f$ and $f^2$ respectively. After the jaws are securely attached to the two ends of the rim, the lever handle $a^4$ is moved in a counter-clockwise direction thereby forcing apart the ends of the rim. The handle $b'$ is then turned in a clock-wise direction thereby drawing the end $c'$ of the rim centerward. The handle $a^4$ is then moved in a clock-wise direction until the end $c$ overlaps the end $c'$ of the rim. The rim is then released and the tire removed. Rims of the type shown in Fig. 1 do not require that handle $a^4$ be first moved in a counter-clock-wise direction. The fixed pivot $b^2$ secures the link $b$ to plate A and permits the link $b$ to be revolved about such pivot. The handle $b'$ is pivoted to link $b$ by means of pivot $b^8$, and therefore can revolve about both pivots $b^2$ and $b^8$. The handle $b'$ in turn is pivotally attached to the plate B, therefore, the plate B can revolve about the pivots $b^2$ and $b^8$. Link $a^7$ of lever A' limits the extent to which the plate B can be rotated about the pivot $b^2$, and the slot in plate B, through which the pivot $b^2$ passes, converts the rotary movement of plate B into a radial reciprocating movement. Pins $b^9$ and $b^{10}$ limit the movement of the handle $b'$.

The force exerted by the machine upon a rim can be increased proportionally in relation to the force applied by the operator by making the handles $a^4$ and $b'$ longer, or by using an extension handle that can be applied to the said handles, because of the increased leverage upon the fulcrum and the place of resistance. The space between the fulcrum and the place of resistance is small relatively to the length of the handle, at the end of which the operating force is applied.

The spring $f^{17}$ normally holds apart the forward ends of the jaws $f$ and $f^2$.

What I claim is:

1. A rim breaker comprising a base plate having at one end a rim clamp, a movable plate having a rim clamp at the corresponding end, a lever device and a link connected thereto, and each pivoted one to the base plate and the other to the movable plate to move the rim clamps toward and from each other, another lever and link device connected together and one pivoted to the movable plate and the other to a fixed pivot, to move said movable plate longitudinally, there being means for guiding the movable plate so that its longitudinal movement is radial to said pivot.

2. In a rim breaker the combination of a fixed base plate, a movable plate having a longitudinal slot near its inner end, rim clamping jaws at the outer ends of the plates, a fixed pivot passing through the slot, a lever and link device connecting the outer ends of the plates and adapted to move the clamping jaws toward and from each other, a lever mounted upon the movable plate and a link connecting the last mentioned lever to said fixed pivot.

3. In a rim breaker the combination of a base plate, a movable plate, a pivot connecting the plates, rim clamping means mounted upon the free ends of the plates, means adapted to reciprocate the movable plate upon the base plate radially thereto, and means adapted to reciprocate the movable plate upon the base plate circumferentially thereto.

4. In a rim breaker the combination of a base plate, a slotted movable plate, a pivot mounted on the base plate extending through the slot in the movable plate, means adapted to radially reciprocate the movable plate comprising a lever pivotally mounted upon the movable plate and a link pivotally mounted upon the lever engaging the pivot extending through the slot in the movable plate, means adapted to circumferentially reciprocate the movable plate comprising a lever pivotally mounted upon the base plate, a link and pivots connecting the last mentioned link to the lever and to the movable plate, and rim clamping jaws mounted on the outer ends of the plates.

In witness whereof I have hereunto subscribed my name this 28th day of April, 1920.

FREDERICK M. ROSS.